I. H. MARKOWITZ.
MIRROR.
APPLICATION FILED SEPT. 9, 1913.
1,116,718.
Patented Nov. 10, 1914.
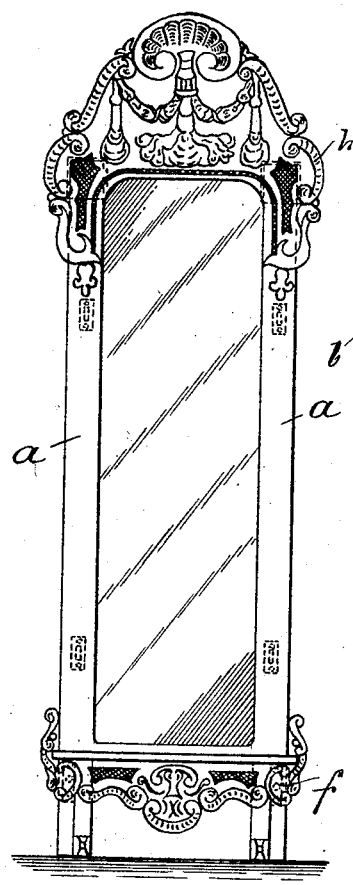
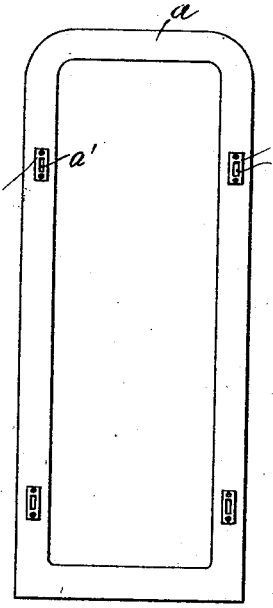
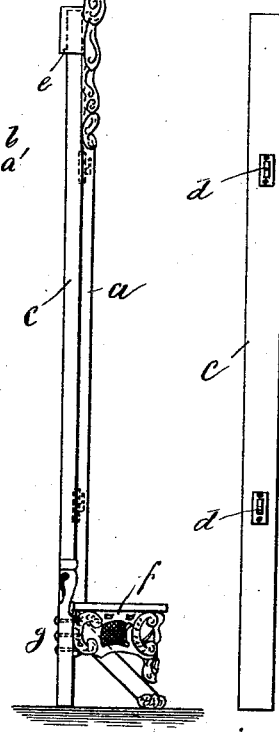
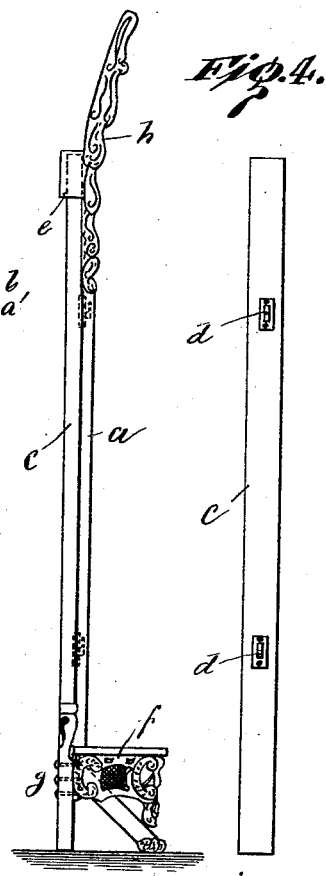
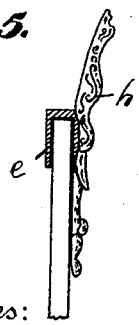
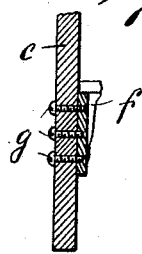
Witnesses:
C. S. Ashleigh
E. W. Akerblom
Inventor
Isidor H. Markowitz
By his Attorney
Max D. Ordmann

UNITED STATES PATENT OFFICE.

ISIDOR H. MARKOWITZ, OF NEW YORK, N. Y.

MIRROR.

1,116,718.  Specification of Letters Patent.  Patented Nov. 10, 1914.

Application filed September 9, 1913. Serial No. 788,929.

*To all whom it may concern:*

Be it known that I, ISIDOR H. MARKOWITZ, citizen of the United States of America, residing at New York, in the county of New York and State of New York, have invented certain new and useful Improvements in Mirrors, of which the following is a specification.

The present invention relates to standing mirrors and has for its object to construct a mirror of sectional removable parts, which will not only simplify the construction but also enable the mirror to be taken apart when moved from one place to the other and thus prevent damage. Hitherto the frame of such standing mirrors has been made as a solid piece, *i. e.* its carved ornamental head and bottom pieces were permanently attached to the side pillars or piers of the frame. The manufacture consequently was very costly and the mirror during transportation was liable to break. To obviate these drawbacks I make the head and bottom pieces of the frame of metal, as cast iron or the like, and provide means for removably securing them in position when assembled.

In the accompanying drawing Figure 1 is a front elevation of the mirror; Fig. 2 a side elevation thereof; Fig. 3 a rear view of the glass frame and Figs. 4, 5 and 6 details of construction.

*a* is the mirror proper, which may be an oblong, rectangular mirror as the ordinary hanging mirror. At its rear it has lateral grooves *a'* over which recessed metal plates *b* are fixed, so as to form sockets. This frame is adapted to be removably fixed to side piers or pillars *c, c* of wood. The piers *c* are provided with hook-shaped projections *d, d* fixed thereto and adapted to engage the sockets *a', b* of the frame *a*. The ornamental head piece *h* is made of metal and is provided at its rear with lateral sockets *e* that are adapted to be slipped over the piers *c*, while the ornamental bottom piece *f*, also made of metal, is adapted to be screwed or otherwise removably secured to the piers, as at *g*. Thus the standing mirror for transportation can be easily and quickly taken apart while the manufacture of the head and bottom pieces is simplified and rendered less costly.

What I claim and desire to secure by Letters Patent is:

An article of manufacture consisting of a standing frame, composed of side piers having hooks and head and bottom pieces removably fastened to said side piers and a mirror or glass frame having lateral sockets engaging the hooks of said side piers.

In testimony whereof I affix my signature in presence of two witnesses.

ISIDOR H. MARKOWITZ.

Witnesses:
E. D. JUNIOR,
D. KLEIN.